US012644000B2

(12) United States Patent
D'Allura et al.

(10) Patent No.: US 12,644,000 B2
(45) Date of Patent: Jun. 2, 2026

(54) POLYMERS WITH ENGINEERED SEGMENT MOLECULAR WEIGHT

(71) Applicant: The LYCRA Company LLC, Wilmington, DE (US)

(72) Inventors: Norman J. D'Allura, Waynesboro, VA (US); Hong Liu, Waynesboro, VA (US); Gregory L. Yoder, Charlottesville, VA (US); Nicholas E. Kurland, Staunton, VA (US); Oguzhan Celebi, Waynesboro, VA (US)

(73) Assignee: The LYCRA Company LLC, Wilmington, DE (US)

( * ) Notice: Subject to any disclaimer, the term of this patent is extended or adjusted under 35 U.S.C. 154(b) by 529 days.

(21) Appl. No.: 16/772,456

(22) PCT Filed: Dec. 12, 2018

(86) PCT No.: PCT/US2018/065214
§ 371 (c)(1),
(2) Date: Jun. 12, 2020

(87) PCT Pub. No.: WO2019/118604
PCT Pub. Date: Jun. 20, 2019

(65) Prior Publication Data
US 2021/0087388 A1        Mar. 25, 2021

Related U.S. Application Data

(60) Provisional application No. 62/599,102, filed on Dec. 15, 2017.

(51) Int. Cl.
$C08L\ 75/04$          (2006.01)
$C08G\ 18/10$          (2006.01)
(Continued)

(52) U.S. Cl.
CPC .............. $C08L\ 75/04$ (2013.01); $C08G\ 18/12$ (2013.01); $C08G\ 18/3206$ (2013.01); (Continued)

(58) Field of Classification Search
None
See application file for complete search history.

(56) References Cited

U.S. PATENT DOCUMENTS 2,929,803 A        3/1960   Frazer et al. ................ 260/77.5
2,929,804 A        3/1960   Steuber ........................ 260/77.5
(Continued)

FOREIGN PATENT DOCUMENTS

EP          0343985          8/1994
EP          0872581          3/2003
(Continued)

OTHER PUBLICATIONS

International Search Report and Written Opinion in PCT/US2018/065214 dated May 22, 2019.
(Continued)

*Primary Examiner* — Ha S Nguyen
(74) *Attorney, Agent, or Firm* — Hoffmann & Baron, LLP

(57)          ABSTRACT

Polymer compositions and processes for extended glycols and under-capping glycols for production of polymer compositions with engineered hard and soft segment molecular weights are provided. Also provided are fibers and articles of manufacture such as fabrics and garments produced from these polymer compositions and processes.

12 Claims, 6 Drawing Sheets

(51) Int. Cl.

| | |
|---|---|
| *C08G 18/12* | (2006.01) |
| *C08G 18/28* | (2006.01) |
| *C08G 18/32* | (2006.01) |
| *C08G 18/48* | (2006.01) |
| *C08G 18/66* | (2006.01) |
| *C08G 18/72* | (2006.01) |
| *C08G 18/73* | (2006.01) |
| *C08G 18/76* | (2006.01) |
| *C08L 75/02* | (2006.01) |
| *D01D 1/02* | (2006.01) |
| *D01D 5/04* | (2006.01) |
| *D01F 6/70* | (2006.01) |
| *D01F 6/94* | (2006.01) |

(52) U.S. Cl.
CPC ..... *C08G 18/3228* (2013.01); *C08G 18/4808* (2013.01); *C08G 18/4854* (2013.01); *C08G 18/7671* (2013.01); *C08L 2203/12* (2013.01)

(56) References Cited

U.S. PATENT DOCUMENTS

| | | | | |
|---|---|---|---|---|
| 5,000,899 | A | † | 3/1991 | Dreibelbis |
| 5,879,799 | A | † | 3/1999 | Yosizato |
| 2009/0182113 | A1 | † | 7/2009 | Rodewald |

FOREIGN PATENT DOCUMENTS

| | | | | |
|---|---|---|---|---|
| EP | 2042535 | | | 10/2011 |
| JP | 2011-080016 | | † | 4/2011 |
| JP | 2013237714 | A | * | 11/2013 |
| KR | 2002-0056670 | | † | 7/2002 |
| WO | 00/39179 | | † | 7/2000 |

OTHER PUBLICATIONS

International Preliminary Report on Patentability in PCT/US2018/065214 dated Jun. 16, 2020.

* cited by examiner
† cited by third party

FIG. 3

| Extended Glycol | Ex. 1 | Ex. 2 | Ex. 3 | Ex. 4 | Comparative Ex. 5 |
|---|---|---|---|---|---|
| PTG L1400, grams | 210.00 | | | | |
| PTG L2200, grams | | 240.00 | 225.00 | 300.00 | |
| Terathane® 2503, grams | | | | | |
| Terathane® 1400, grams | 90.00 | 60.00 | | | |
| Terathane® 1800, grams | | | 75.00 | | |
| Isonate® 125MDR, grams | 30.03 | 15.47 | 13.60 | 8.01 | |
| Measured Mn | 3446 | 3467 | 3493 | 3428 | 3384 |
| Polyurethaneurea | | | | | |
| Extended glycol, grams | 300.00 | 300.00 | 250.00 | 300.00 | 300.00 |
| PTG L3500, grams | | | | | |
| Isonate® 125MDR, grams | 40.01 | 39.87 | 33.09 | 40.13 | 40.43 |
| DMAc, grams | 587.55 | 587.83 | 489.31 | 588.28 | 589.23 |
| EDA/DMAc (1.0 meq/g), grams | 138.76 | 138.71 | 116.96 | 138.81 | 140.66 |
| DEA/DMAc (1.2 meq/g), grams | 10.62 | 10.04 | 7.17 | 10.05 | 7.76 |
| Estimated SSMW/HSMW ratio | 14.24 | 14.24 | 14.24 | 14.24 | 14.24 |
| Estimated Urea Segment wt% | 6.56 | 6.56 | 6.56 | 6.56 | 6.56 |
| Yarn Properties | Ex. 1 | Ex. 2 | Ex. 3 | Ex. 4 | Comparative Ex. 5 |
| Ratio of 5TM100/5TP300 | 0.104 | 0.148 | 0.134 | 0.162 | 0.129 |
| Set, % | 13.4 | 10.9 | 13.6 | 11.8 | 14.6 |
| Elongation, % | 516 | 600 | 589 | 624 | 631 |

| Polymer by Undercapping | Ex. 6 | Ex. 7 | Ex. 8 | Ex. 9 | Ex. 10 | Comparative Ex. 11 | Ex. 12 | Ex. 13 | Ex. 14 | Ex. 15 | Comparative Ex. 16 |
|---|---|---|---|---|---|---|---|---|---|---|---|
| PTG L2200, grams | 180.00 | 180.00 | 180.00 | 180.00 | 180.00 | 180.00 | 240.00 | 240.00 | 240.00 | 240.00 | 240.00 |
| Terathane® 1800, grams | 60.00 | 60.00 | 60.00 | 60.00 | 60.00 | 60.00 | | | | | |
| Isonate® 125MDR, grams | 40.51 | 40.51 | 40.51 | 40.51 | 40.51 | 40.51 | 44.70 | 44.70 | 44.70 | 47.19 | 54.41 |
| Extra Isonate® 125MDR, grams | 1.00 | 2.00 | 3.00 | 4.00 | 5.00 | 6.00 | 5.27 | 4.00 | 3.00 | 3.00 | NONE |
| DMAc, grams | 551.76 | 550.62 | 549.47 | 548.33 | 547.19 | 546.04 | 556.88 | 558.33 | 559.47 | 556.63 | 551.80 |
| EDA/DMAc (2.0 meq/g), grams | 49.30 | 53.29 | 57.28 | 61.27 | 65.26 | 69.25 | 64.87 | 59.81 | 55.82 | 65.75 | 82.58 |
| DEA/DMAc (1.0 meq/g), grams | 7.11 | 7.15 | 7.18 | 7.21 | 7.24 | 7.27 | 7.35 | 7.31 | 7.28 | 7.36 | 7.49 |
| Estimated SSMW/HSMW ratio | 17.17 | 15.91 | 14.82 | 13.87 | 13.04 | 12.30 | 13.33 | 14.44 | 15.46 | 13.16 | 10.51 |
| Estimated Urea Segment wt% | 5.53 | 5.94 | 6.35 | 6.75 | 7.15 | 7.55 | 7.00 | 6.50 | 6.11 | 7.09 | 8.71 |
| Yarn Properties | Ex. 6 | Ex. 7 | Ex. 8 | Ex. 9 | Ex. 10 | Comparative Ex. 11 | Ex. 12 | Ex. 13 | Ex. 14 | Ex. 15 | Comparative Ex. 16 |
| Ratio of 5TM100/5TP300 | 0.179 | 0.171 | 0.167 | 0.157 | 0.158 | NA | 0.102 | 0.111 | 0.111 | 0.092 | 0.083 |
| Set, % | 13.22 | 13.28 | 13.25 | 14.27 | 15.85 | NA | 12.93 | 13.20 | 12.08 | 13.65 | 21.58 |
| Elongation, % | 539 | 549 | 532 | 564 | 612 | NA | 512 | 537 | 519 | 500 | 491 |

| Polymer by Undercapping | Ex. 18 | Ex. 19 | Ex. 20 | Ex. 21 | Ex. 22 | Ex. 24 | Ex. 25 | Comparative Ex. 26 | Comparative Ex. 27 | Ex. 28 | Ex. 29 | Ex. 30 |
|---|---|---|---|---|---|---|---|---|---|---|---|---|
| Terathane® 1800, grams | 240.00 | 240.00 | 240.00 | 240.00 | 240.00 | 240.00 | 240.00 | 240.00 | 240.00 | 240.00 | 240.00 | 240.00 |
| Isonate® 125 MDR, grams | 38.34 | 38.34 | 40.04 | 40.04 | 43.50 | 43.50 | 43.50 | 47.04 | 54.41 | 41.97 | 41.97 | 41.97 |
| Extra Isonate® 125 MDR, grams | 3.30 | 6.59 | 3.14 | 6.30 | 0.00 | 3.71 | 5.59 | 8.28 | 0.00 | 5.24 | 1.93 | 3.59 |
| DMAc, grams | 566.40 | 562.64 | 564.64 | 561.03 | 564.28 | 560.03 | 557.88 | 550.76 | 551.80 | 560.03 | 563.81 | 561.92 |
| EDA/DMAc (2.0 meq/g), grams | 31.62 | 44.77 | 37.79 | 50.37 | 39.05 | 53.85 | 61.35 | 86.21 | 82.58 | 53.88 | 40.68 | 47.28 |
| DEA/DMAc (1.0 meq/g), grams | 7.09 | 7.19 | 7.14 | 7.24 | 7.15 | 7.26 | 7.32 | 7.51 | 7.49 | 7.26 | 7.16 | 7.21 |
| Estimated SSMW/HSMW ratio | 26.88 | 19.18 | 22.62 | 17.09 | 21.91 | 16.01 | 14.09 | 10.08 | 10.51 | 16.00 | 21.05 | 18.18 |
| Estimated Urea Segment wt% | 3.62 | 4.98 | 4.26 | 5.56 | 4.39 | 5.91 | 6.66 | 9.06 | 8.71 | 5.91 | 4.56 | 5.24 |
| Yarn Properties | Ex. 18 | Ex. 19 | Ex. 20 | Ex. 21 | Ex. 22 | Ex. 24 | Ex. 25 | Comparative Ex. 26 | Comparative Ex. 27 | Ex. 28 | Ex. 29 | Ex. 30 |
| Ratio of 5TM100/5TP300 | 0.130 | 0.110 | 0.106 | 0.127 | 0.107 | 0.120 | 0.104 | NA | 0.083 | 0.099 | 0.120 | 0.108 |
| Set, % | 12.5 | 12.7 | 14.0 | 12.8 | 10.8 | 11.4 | 13.5 | NA | 21.8 | 14.7 | 11.1 | 11.1 |
| Elongation, % | 524 | 554 | 562 | 564 | 553 | 530 | 551 | NA | 515 | 540 | 534 | 540 |

FIG. 6

| Polymer by Undercapping | Comparative Ex. 31 | Comparative Ex. 32 | Ex. 33 | Ex. 34 | Ex. 35 | Ex. 36 | Ex. 37 |
|---|---|---|---|---|---|---|---|
| Terathane® 1400, grams | 240.00 | 240.00 | 240.00 | 240.00 | 240.00 | 240.00 | 240.00 |
| Isonate® 125 MDR, grams | 60.73 | 60.73 | 55.40 | 55.40 | 55.40 | 52.46 | 52.46 |
| Extra Isonate® 125 MDR, grams | 0.00 | 4.39 | 1.38 | 3.15 | 4.89 | 1.81 | 3.28 |
| DMAc, grams | 569.83 | 564.81 | 574.34 | 572.32 | 570.33 | 577.22 | 575.53 |
| EDA/DMAc (2.0 meq/g), grams | 76.75 | 94.25 | 61.02 | 68.05 | 74.99 | 50.97 | 56.86 |
| DEA/DMAc (1.0 meq/g), grams | 7.64 | 7.77 | 7.51 | 7.57 | 7.62 | 7.44 | 7.48 |
| Estimated SSMW/HSMW ratio | 11.62 | 9.49 | 14.56 | 13.08 | 11.88 | 17.36 | 15.60 |
| Estimated Urea Segment wt% | 7.95 | 9.56 | 6.46 | 7.13 | 7.79 | 5.47 | 6.05 |

| Yarn Properties | Comparative Ex. 31 | Comparative Ex. 32 | Ex. 33 | Ex. 34 | Ex. 35 | Ex. 36 | Ex. 37 |
|---|---|---|---|---|---|---|---|
| Ratio of 5TM100/5TP300 | 0.073 | NA | 0.099 | 0.098 | 0.096 | 0.117 | 0.110 |
| Set, % | 20.6 | NA | 15.4 | 17.5 | 18.0 | 13.8 | 14.8 |
| Elongation, % | 439 | NA | 444 | 498 | 505 | 458 | 508 |

POLYMERS WITH ENGINEERED SEGMENT MOLECULAR WEIGHT

FIELD

The present invention relates to the production of segmented polyurethanes and polyurethaneureas with engineered hard and soft segment molecular weights by extended glycol process and/or under-capping process, to compositions comprising these polymers and to articles of manufacture produced from these compositions. In one nonlimiting embodiment, the present invention relates to spandex fibers produced from these polymers with the engineered hard and soft segment molecular weights and to articles of manufacture produced from these spandex fibers.

BACKGROUND

U.S. Pat. Nos. 2,929,803 and 2,929,804 disclosed segmented polyurethaneurea compositions with the use of extended glycol and under-capping processes. These patents disclose a urea hard segment weight percent from about 10% to about 40% of the polymer and segment molecular weight ratios (SSMW/HSMW) significantly lower than 13.0.

SUMMARY

It has now been found that by engineering the spandex polymer soft and hard segment lengths or molecular weights and controlling the soft and hard segment concentration or weight percent through use of a extended glycol process and/or under-capping process during production, starting with a glycol with lower molecular weight, the spandex manufacturing cost associated with high molecular weight glycols can be reduced. Further, compositions produced in accordance with this disclosure result in fibers exhibiting high elongation, low set and soft stretch/recovery not possible to achieve using with conventional processes and lower molecular weight glycols.

An aspect of the present invention thus relates to polymer compositions comprising soft and hard segmented polyurethanes or polyurethaneureas with an HSWT % less than 7.8% and a segment molecular weight ratio (SSMW/HSMW) larger than 12.0 and methods for their production. Other aspects of the present invention relate to fibers, fabrics and other articles of manufacture prepared from these compositions and methods.

In one nonlimiting embodiment, the present invention relates to spandex fibers comprising a polymer of segmented polyurethanes or polyurethaneureas with engineered hard and soft segment molecular weights produced by extended glycol and/or under-capping processes. In the polymer, the molecular weight of the soft segment, even with the use of lower molecular weight glycol, can be increased without reducing molecular weight of the hard segment as typically observed in conventional prepolymer production processes. The extended glycol process of the present invention comprises two step reactions to make the isocyanate-terminated prepolymer. In the first step, excess amount of a lower molecular weight glycol is used to react with a diisocyanate to faun a hydroxy-terminated glycol, or extended glycol. In one nonlimiting embodiment, the molecular weight of the lower molecular weight glycol is less than 2500. This extended glycol is further reacted with excess amount of a diisocyanate in the second step to produce an isocyanate-terminated prepolymer or capped glycol. The diisocyanate used in the first step to make the extended glycol can be the same or different from the diisocyanate used in the second step to make the capped glycol prepolymer. This capped glycol based on the extended glycol is then dissolved in a solvent and chain extended with a diol or diamine to form a segmented polyurethane or polyurethaneurea polymer with engineered soft segment and hard segment molecular weights prior to spinning into fibers.

In some nonlimiting embodiments, an under-capping process is then performed which comprises adding controlled amount of a second diisocyanate to an isocyanated-terminated prepolymer which is produced by reacting a glycol at a low capping ratio with a first diisocyanate. The first diisocyanate and the second diisocyanate can be the same or different. The mixture including the added second diisocyanate and the capped glycol prepolymer from the first diisocyanate is dissolved into a solvent, and a diol or diamine chain extender is then added to produce the polyurethane or polyurethaneurea polymer with engineered soft and hard segment molecular weights.

In one nonlimiting embodiment the process further comprises extending a lower molecular weight (MW) glycol to a higher MW glycol with urethane linkages, or a hydroxy-terminated polyurethane or polyurethaneurea, which is used for making a capped glycol prepolymer, and then adding additional diisocyanate to the capped glycol prepolymer prior to the addition of the chain extender so that molecular weight of the hard segment is not affected by the low capping ratio.

BRIEF DESCRIPTION OF FIGURES

FIG. 3 is a Table listing components of fibers and their yarn properties of Examples 1 through 4 of the present invention prepared by an extended glycol process compared to Comparative Example 5, a yarn produced by the conventional process starting with a high molecular weight glycol of 3500. As shown by the Table of FIG. 3, fibers prepared in accordance with the extended glycol process with polymer compositions of the present invention exhibited similar set and elongation properties as compared to Comparative Example 5, a yarn produced from the much more costly convention process.

FIG. 4 is a Table listing components of fibers and their yarn properties of Examples 6-10 and 12-15 of the present invention prepared by an under-capping process compared to Comparative Example 11, a yarn prepared by the under-capping process of the present invention but from a segmented polyurethane with an HSWT % greater than 7.8% and a segment molecular weight ratio (SSMW/HSMW) less than 12.0, and Comparative Example 16, a yarn prepared by conventional under-capping also having a molecular weight ratio (SSMW/HSMW) of the soft segment to the hard segment of less than 12.0 and a urea hard segment weight percent (HSWT %) greater than 7.8. As shown by the Table of FIG. 4, fibers prepared in accordance with the process and with the polymer compositions of the present invention having a molecular weight ratio (SSMW/HSMW) of the soft segment to the hard segment of greater than 12.0 and a urea hard segment weight percent (HSWT %) less than 7.8. exhibited desirable set and elongation properties as compared to Comparative Example 11 and Comparative Example 16.

FIG. 5 is a Table listing components of fibers and their yarn properties of Examples 18-25 and 28-30 of the present invention prepared by under-capping compared to Comparative Examples 26 and 27. Examples 18-25 and 28-30 are additional examples of polymers prepared by the under-capping process of the present invention while Comparative Example 26 was made by the under-capping process but is outside the scope of the present invention, and Comparative Example 27 was made by a conventional capping process with no additional MDI added to the capped glycol prepolymer.

FIG. 6 is a Table listing components of fibers and their yarn properties of Examples 33-37 of the present invention prepared by the under-capping process, except an even lower molecular weight glycol, Terathane® PTMEG 1400, was used in reaction with Isonate® 125MDR for making the capped glycol prepolymer, followed by addition of extra amount of Isonate® 125MDR at different levels, dissolution with DMAc and chain extension with EDA/DEA solutions to make the polymer solutions. Comparative Example 31 was made via a conventional capping process and demonstrates a composition and properties outside the scope of this invention. Comparative Example 32 shown in this FIG was made via the under-capping process but outside the composition range of this invention and was unable to be spun into a fiber.

DETAILED DESCRIPTION

The present invention provides compositions with a range of segmented polyurethanes or polyurethaneureas with engineered hard and soft segment molecular weights produced by an extended glycol process and/or under-capping process. With the engineered segmental molecular weights, the molecular weight ratios and their relative concentrations in the polymer, the compositions are particularly useful in low cost production of spun spandex fibers with unique properties such as low set, high elongation and flat stretch/recovery which are either not achievable or costly when prepared by conventional production methods and with conventional ingredients.

The definition of spandex fibers requires at least 85% of the fiber-forming substances comprise segmented polyurethanes or polyurethaneureas which consist of alternating soft segments and hard segments along the polymer chains. In addition to the total molecular weight of the polymer, for a specific segmented polyurethane or polyurethaneurea, the spandex fiber properties are strongly dependent on the chemical structures and the segmental lengths (or molecular weights) of both the soft segment and the hard segment of the polymer.

In a typical conventional process of making spandex polymers, a glycol (diols of polyethers, polyesters or polycarbonates, including their copolymers or mixtures) is reacted with a diisocyanate in excess amount to form an isocyanate-terminated polyurethane or polyurethaneurea prepolymer. This prepolymer is then diluted in a solvent and chain extended with a short chain diol or diamine to grow the polymer chain length. A terminator can be used to control the molecular weight of the polymer. In this type of conventional process, the soft segment is formed during the prepolymer formation stage and the hard segment is formed during the chain extension stage. Accordingly, the formed polymer chains consist only of alternating soft segments and hard segments, and the number average soft segment molecular weight and hard segment molecular weight of the polymer can be estimated mathematically as shown below:

$$\text{SSMW}=R\times(\text{MW}_{gl}+\text{MW}_{di})/(R-1) \tag{1}$$

$$\text{HSMW}=R\times(\text{MW}_{ex}+\text{MW}_{di}) \tag{2}$$

where in equation (1) and (2), SSMW and HSMW stand for soft segment molecular weight and hard segment molecular weight, respectively; $\text{MW}_{gl}$, $\text{MW}_{di}$ and $\text{MW}_{ex}$ represent the number average molecular weight of the glycol, the formula weight of the diisocyanate and the extender or their averages in the situation of mixed diisocyanates or extenders, respectively; and R in the equations is the capping ratio, the molar ratio of the diisocyanate to the glycol. Combining equation (1) and (2) provides a correlation of the SSMW and the HSMW referred to as the segment molecular weight ratio, as shown in equation (3).

$$\text{SSMW/HSMW}=(1/(R-1))\times(\text{MW}_{gl}+\text{MW}_{di})/(\text{MW}_{ex}+\text{MW}_{di}) \tag{3}$$

Figure 1:
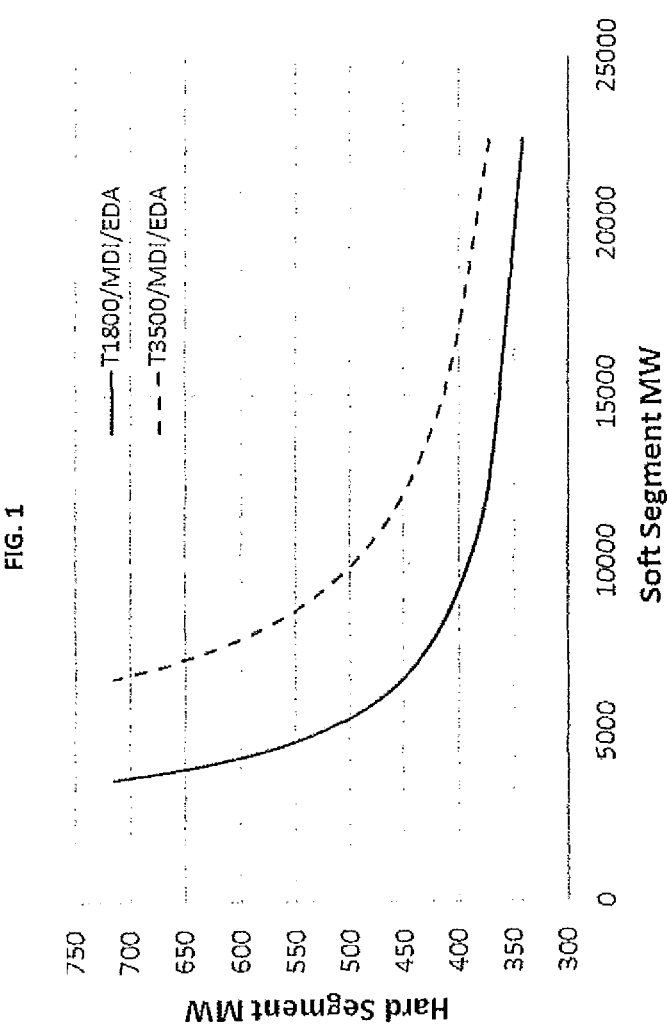
FIG. 1 provides a schematic of a nonlimiting embodiment of an extended glycol process of the present invention wherein the effect of glycol MW (a glycol with lower MW 1800 vs. a glycol with extended or higher MW) on the soft segment molecular weight and the hard segment molecular weight in a polyurethaneurea polymer based on PTMEG/MDI/EDA. The segment molecular weights can be increased with the extended glycol without the limitation of the starting low MW glycol. In this process, the engineered segment lengths or MW are dependent on the MW of the extended glycol and the capping ratio (the molar ratio of the diisocyanate to the extended glycol).

Based on equation (3), once the ingredient type is determined, such as poly(tetramethylene ether) glycol (PTMEG), methylene bis(4-phenylisocyanate) (MDI) and ethylenediamine (EDA), the SSMW and HSMW are dependent to each other with a function of the capping ratio R and the number average molecular weight of the glycol. This relationship is illustrated in FIG. 1, using PTMEG MW 1800 and 3500 as examples.

In the situation of fixed ingredients such as PTMEG (MW 1800) capped with MDI and chain extended with EDA, this relationship is indicative of there being two ways to achieve data points above the line shown in the graph.

The first method comprises an extended glycol approach wherein PTMEG with lower MW is extended to a higher MW before making the isocyanate-terminated prepolymer. This can be achieved by reacting excess glycol with a diisocyanate which functions as a linker connecting two or more glycol molecules. The desired molecular weight of the extended glycol is determined by the relative molar ratio (r>1) of the glycol to the diisocyanate. The diisocyanate used for glycol extension can be the same or different from the diisocyanate used for making the prepolymer.

$$\text{Extended Glycol MW}_{egl}=(r\times\text{MW}_{gl}+\text{MW}_{di})/(r-1) \tag{4}$$

For example, to extend PTMEG from 1800 to 3500 MW with MDI, the r should be 2.2060. This extended glycol can be used for the conventional prepolymer formation and chain extension processes to provide the SSMW and HSMW following equation (1) and (2) except where the $\text{MW}_{gl}$ shall be substituted by the extended glycol $\text{MW}_{egl}$.

Figure 2:
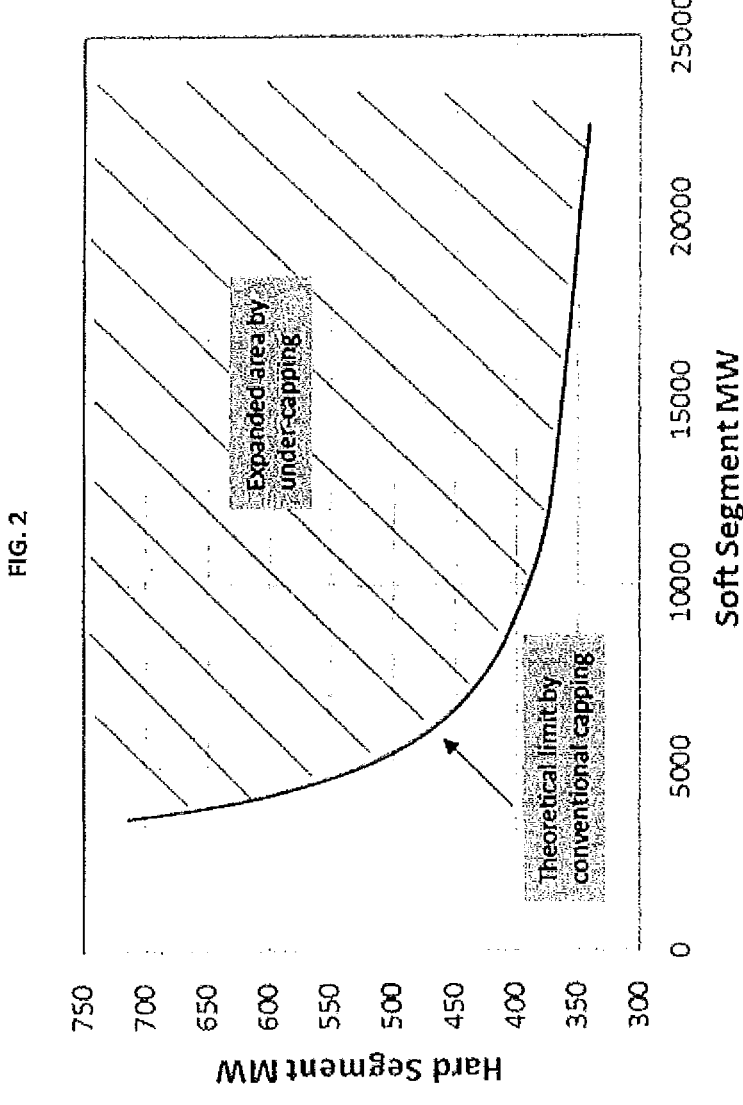
FIG. 2 provides a schematic of a nonlimiting embodiment of an under-capping process of the present invention wherein the soft segment molecular weight is increased in the first step by using a low capping ratio in capping and additional methylene diphenyl diisocyanate (MDI) is added in the second step to the capped glycol to increase the hard segment molecular weight due to the initial low capping ratio. By this process, the segmental lengths or molecular weights can be engineered independently, not limited by the capping ratio or a glycol with lower MW.

The second method comprises an under-capping process wherein a prepolymer is made for the desired soft segment MW and then an extra amount of diisocyanate is added into the capped glycol prepolymer prior to the chain extension step. In this process, the SSMW still follows equation (1) determined by the capping ratio R, and the HSMW is determined by the unreacted diisocyanate in the prepolymer and the extra amount of diisocyanate added into the prepolymer by equation (5). Again, the diisocyanate used to make the prepolymer and the diisocyanate added into the prepolymer for tuning the HSMW can be the same or different.

$$HSMW = R \times (MW_{ex} + MW_{di}) + K(R^2/(R-1)) \times (MW_{ex} + MW_{xdi}) \quad (5)$$

where K is the molar ratio of extra added diisocyanate to the original diisocyanate in making the prepolymer. The $MW_{xdi}$ is the molecular weight of the extra added diisocyanate. In the event that the type of the extra amount of diisocyanate added before chain extension is the same as the type of the original diisocyanate used in making the prepolymer, then $MW_{xdi}$ is equal to $MW_{di}$. The HSMW is very much dependent on how much extra diisocyanate is added into the prepolymer and at any point can be above the theoretical limitation (shaded area) as illustrated in FIG. 2 using a PTMEG MW 1800, MDI and EDA as an example.

The weight percent of the soft segment content (SSWT %) in the polymer can be calculated by equation (6) based on the ingredient weights in making the prepolymer and the total weight of the polymer solids:

$$SSWT \% = (WT_{gl} + WT_{di}/R) \times 100/WT_{polymer} \quad (6)$$

where $WT_{gl}$ and $WT_{di}$ are the respective weight of the glycol (or extended glycol) and the diisocyanate, R is the molar ratio of the diisocyanate to the glycol (or the extended glycol) in making the isocyanate-terminated prepolymer, and $WT_{polymer}$ is the total weight of the polymer solids consisting of all components in making the segmented polyurethane or polyurethaneurea.

Accordingly, the weight percent of the hard segment content in the polymer can be estimated by equation (7)

$$HSWT \% = 100 - SSWT \% \quad (7)$$

The molecular weights referred to in this description, including the glycol molecular weight, the segmental molecular weights and the polymer molecular weight, are number average molecular weights.

The present invention provides polymer compositions comprising segmented polyurethanes or polyurethaneureas according to the present invention, based on glycols with molecular weight less than 2500, preferably having the molecular weight ratio (SSMW/HSMW) of the soft segment to the hard segment larger than 12.0 and the urea hard segment weight percent (HSWT %) less than 7.8.

The present invention also provides polymers produced by the extended glycol and/or under capping processes.

The present invention also provides fibers comprising the polymer compositions of the present invention as well as articles of manufacture at least a portion of which comprises a fiber based on the compositions described herein. Non-limiting examples of such articles of manufacture of the present invention include fabrics and garments. In one nonlimiting embodiment, the fabrics and garments are for apparel and/or hygiene applications.

In one nonlimiting embodiment of the present invention, the polymer compositions are useful in producing spandex with low set, high elongation and flat stretch/recovery.

In one nonlimiting embodiment, the spandex fiber has a soft segment melting point <5 or 6° C.

In one nonlimiting embodiment, the spandex fibers are spun from the polymer compositions. Spandex fibers may be, for example, but not limited to, dry spun, wet spun or melt spun. In one nonlimiting embodiment, the spandex fibers are dry spun.

By "low set" as used herein, it is meant a Set % less than 20, more preferably less than 16%.

By "high elongation" as used herein, it is meant an elongation greater than 500%.

By "flat stretch/recovery" as used herein, it is meant the flatness index of stretch and recovery of the spandex determined by the ratio of 5TM100/5TP300. Fibers prepared via compositions and methods of the present invention exhibit a 5TM100/5TP300 ratio of greater than >0.09 in general.

The present invention also provides methods to produce the desired polyurethanes or polyurethaneureas with engineered segmental molecular weights, their molecular weight ratios and relative concentrations by the use of an extended glycol process or an under-capping process or a combination of the extended glycol and under-capping process.

The extended glycol process comprises two step reactions to make the isocyanate-terminated prepolymer. In the first step, excess amount of a lower molecular weight glycol (typical MW<2500) is used to react with a diisocyanate to form a hydroxy-terminated glycol, or an extended glycol with typical MW>2500. This extended glycol is further reacted with excess amount of a diisocyanate in the second step reaction to produce an isocyanate-terminated prepolymer or capped glycol. The diisocyanate used in the first step reaction to make the extended glycol can be same or different from the diisocyanate used in the second step reaction to make the capped glycol prepolymer. This capped glycol based on the extended glycol is then dissolved in a solvent and chain extended with a diamine extender and a monoamine as the terminator to form a segmented polyurethane or polyurethaneurea polymer with engineered soft segment and hard segment molecular weights prior to spinning into fibers. The molecular weight of the extended glycol and the capping ratio thereafter in making the capped glycol prepolymer should be controlled in order to provide the desired molecular weight ratio (SSMW/HSMW) of the soft segment to the hard segment and the urea hard segment weight percent (HSWT %) for the segmented polyurethane or polyurethaneureas according to the present invention.

The under-capping process comprises adding controlled amount of a second diisocyanate to an isocyanated-terminated prepolymer which is produced by reacting a glycol at a low capping ratio (typically less than 1.50) with a first diisocyanate. The first diisocyanate and the second diisocyanate can be the same or different. The mixture including the added second diisocyanate and the capped glycol prepolymer from the first diisocyanate is dissolved into a solvent, and a diol or diamine chain extender and a monoamine terminator are then added to produce the polyurethane or polyurethaneurea polymer with engineered soft and hard segment molecular weights. The capping ratio in making the capped glycol prepolymer and the amount of second diisocyanate added to the capped glycol should be controlled in order to provide the desired molecular weight ratio (SSMW/HSMW) of the soft segment to the hard segment and the urea hard segment weight percent (HSWT %) for the segment polyurethanes or polyurethaneureas according to the present invention.

Nonlimiting examples of diisocyanates useful in the present invention include 4,4'-methylene bis(phenyl isocyanate)

(also referred to as 4,4-diphenylmethane diisocyanate (MDI)), 2,4'-methylene bis(phenyl isocyanate, 4,4'-methylenebis(cyclohexyl isocyanate), 1,4-xylenediisocyanate, 1,4-bis(isocyanatomethyl)cyclohexane, 2,6-toluenediisocyanate, 2,4-toluenediisocyanate, and mixtures thereof. Examples of specific diisocyanates include Takenate® 500 and FORTIMO® 1,4-H6XDI (Mitsui Chemicals), Mondur® MB (Bayer), Lupranate® M (BASF), and Isonate® 125 MDR (Dow Chemical), and combinations thereof.

Nonlimiting examples of glycols useful according to the present invention include polyether glycols such as poly(tetramethylene ether) glycols (PTMEG), copolyether glycols such as poly(tetramethyleneether-co-ethyleneether) glycol and poly(tetramethylene ether-co-2-methyltetramethylene ether) glycol, polyester and copolyester glycols such as polycaprolactone diol and those produced by condensation polymerization of aliphatic dicarboxylic acids and diols, or their mixtures, of low molecular weights with no-more than 12 carbon atoms in each molecule, and polycarbonate glycols produced by condensation polymerization of aliphatic diols with phosgene, dialkylcarbonates or diarylcarbonates. Examples of specific commercially available glycols are Terathane® glycols (INVISTA of Wichita, Kansas, USA), PTG-L glycols (Hodogaya Chemical Co., Ltd., Tokyo, Japan), ETERNACOLL® diols (Ube Industries, Ltd., Tokyo, Japan) and STEPANPOL® polyols (Stepan, Illinois, USA).

Nonlimiting examples of diamine chain extenders useful in making the segmented polyurethaneureas according to the present invention include one or more diamines selected from 1,2-ethylenediamine; 1,4-butanediamine; 1,2-butanediamine; 1,3-butanediamine; 1,3-diamino-2,2-dimethylbutane; 1,6-hexamethylenediamine; 1,12-dodecanediamine; 1,2-propanediamine; 1,3-propanediamine; 2-methyl-1,5-pentanediamine; 1-amino-3,3,5-trimethyl-5-aminomethylcyclohexane; 2,4-diamino-1-methylcyclohexane; N-methyl-amino-bis(3-propylamine); 1,2-cyclohexanediamine; 1,4-cyclohexanediamine; 4,4'-methylene-bis(cyclohexylamine); isophorone diamine; 2,2-dimethyl-1,3-propanediamine; meta-tetramethylxylenediamine; 1,3-diamino-4-methylcyclohexane; 1,3-cyclohexane-diamine; 1,1-methylene-bis(4,4'-diaminohexane); 3-aminomethyl-3,5,5-trimethylcyclohexane; 1,3-pentanediamine (1,3-diaminopentane); m-xylylene diamine; and Jeffamine® (Texaco). When a segmented polyurethane with urethane hard segments is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy)benzene, and 1,4-butanediol and mixtures thereof.

Nonlimiting examples of useful chain terminators for the present invention include one or more monofunctional amines selected from ethylamine, propylamine, isopropylamine, n-butylamine, sec-butylamine, tert-butylamine, isobutylamine, isopentylamine, 1-hexylamine, 1-octylamine, 2-ethyl-1-hexaneamine, cyclohexylamine, N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tertbutyl-N-isopropylamine, N-isopropyl-N-cyclohexylamine, N-ethyl-N-cyclohexylamine, N,N-diethanolamine, and 2,2,6,6-tetramethylpiperidine.

A non-limiting example of the solvent used in the present invention is N,N-dimethylacetamide (DMAc).

Classes of additives that may be optionally included in polyurethane and polyurethaneurea compositions are listed below. An exemplary and non-limiting list include: anti-oxidants, UV stabilizers, colorants, pigments, cross-linking agents, phase change materials (paraffin wax), antimicrobials, minerals (e.g., copper), microencapsulated additives (e.g., aloe vera, vitamin E gel, aloe vera, sea kelp, nicotine, caffeine, scents or aromas), nanoparticles (e.g., silica or carbon), nano-clay, calcium carbonate, talc, flame retardants, antitack additives, chlorine degradation resistant additives, vitamins, medicines, fragrances, electrically conductive additives, dyeability and/or dye-assist agents (such as quaternary ammonium salts). Other additives which may be added to the polyurethaneurea compositions include adhesion promoters, anti-static agents, anti-creep agents, optical brighteners, coalescing agents, electroconductive additives, luminescent additives, lubricants, organic and inorganic fillers, preservatives, texturizing agents, thermochromic additives, insect repellants, and wetting agents, stabilizers (hindered phenols, zinc oxide, hindered amine), slip agents (silicone oil) and combinations thereof.

The additive may provide one or more beneficial properties including: dyeability, hydrophobicity (e.g., polytetrafluoroethylene (PTFE)), hydrophilicity (e.g., cellulose), friction control, chlorine resistance, degradation resistance (e.g., antioxidants), adhesiveness and/or fusibility (e.g., adhesives and adhesion promoters), flame retardance, antimicrobial behavior (silver, copper, ammonium salt), barrier, electrical conductivity (carbon black), tensile properties, color, luminescence, recyclability, biodegradability, fragrance, tack control (e.g., metal stearates), tactile properties, set-ability, thermal regulation (e.g., phase change materials), nutriceutical, delustrant such as titanium dioxide, stabilizers such as hydrotalcite, a mixture of huntite and hydromagnesite, UV screeners, and combinations thereof.

In one nonlimiting embodiment, the process steps involved in making the segmented polyurethanes or polyurethaneureas of the present invention can be a batch process or a continuous process or their combinations. In one nonlimiting embodiment, an extended glycol is made by a batch process, which is further supplied to make the isocyanate-terminated capped glycol prepolymer and to make the polymer with chain extension and termination in a solvent by a continuous polymerization process. For another example, adding and mixing a diisocyanate to a capped glycol prepolymer in the under-capping process can be conducted in a batch process or a continuous process.

In another nonlimiting embodiment, steps involved in making an extended glycol and/or a capped glycol prepolymer are performed with heat, with or without the use of a catalyst, typically in a temperature range of 50 to 100° C.

In some nonlimiting embodiments, the process further comprises the step of extending a glycol of low molecular weight to a hydroxy-terminated polyurethane or polyurethaneurea or an extended glycol, prior to making an isocyanate-terminated or capped glycol prepolymer followed by chain extension, so that both molecular weights of the soft segment and the hard segment can be increased without limitation by the low molecular weight of the starting glycol. See FIG. 1.

In some nonlimiting embodiments, the process further comprises the step of adding an additional diisocyanate to an isocyanate-terminated or capped glycol prepolymer so that molecular weight of the hard segment is not affected by the low capping ratio prior to the addition of a chain extender. See FIG. 2.

As shown by the FIGs., the extended glycol and/or under-capping process of the present invention is useful in production of segmented polyurethanes or polyurethaneureas with engineered hard and soft segment molecular weights.

EXAMPLES

Having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Material List

Terathane® PTMEG 1800 is a poly(tetramethylene ether) glycol, with a number average molecular weight of 1800 grams/mole, supplied by INVISTA (Wichita, Kansas, United States).

Terathane® PTMEG 1400 is a poly(tetramethylene ether) glycol, with a number average molecular weight of 1400 grams/mole, supplied by INVISTA (Wichita, Kansas, United States).

PTG L1400 is a copolyether glycol of tetrahydrofuran (THF) and 3-methyltetrahydrofuran (3MeTHF), with a number average molecular weight of 1400 grams/mole and a content of 14% (mole percent) from 3MeTHF, supplied by Hodogaya Chemical Co., Ltd. (Tokyo, Japan).

PTG L2200 is a copolyether glycol of tetrahydrofuran (THF) and 3-methyltetrahydrofuran (3MeTHF), with a number average molecular weight of 2200 grams/mole and a content of 14% (mole percent) from 3MeTHF, supplied by Hodogaya Chemical Co., Ltd. (Tokyo, Japan).

PTG L3500 is a copolyether glycol of tetrahydrofuran (THF) and 3-methyltetrahydrofuran (3MeTHF), with a number average molecular weight of 3500 grams/mole and a content of 14% (mole percent) from 3MeTHF, supplied by Hodogaya Chemical Co., Ltd. (Tokyo, Japan).

Terathane® 2503 is a copolyether glycol of tetrahydrofuran (THF) and 3-methyltetrahydrofuran (3MeTHF), with a number average molecular weight of 2500 grams/mole and a content of 10% (mole percent) from 3MeTHF, produced by DuPont (Wilmington, Del., United States).

Isonate® 125MDR or MDI is a mixture of diphenylmethane diisocyanate containing 98% 4,4'-MDI isomer and 2% 2,4'-MDI isomer (commercially available from the Dow Company, Midland, Mich.).

EDA stands for ethylenediamine as a chain extender; DEA stands for N,N-diethylamine as the chain terminator; DMAc stands for N,N-dimethylacetamide as the solvent.

Test Methods

The viscosity of the polymer solutions was determined in accordance with the method of ASTM D1343-69 with a Model DV-8 Falling Ball Viscometer (Duratech Corp., Waynesboro, Va.) operated at 40° C. and reported as poises.

The solid content in the polymer solutions was measured by a microwave heated moisture/solids analyzer, Smart System 5 (CEM Corp., Matthews, N.C.).

Percent isocyanate (% NCO) of the capped glycol prepolymer was determined according to the method of S. Siggia. "Quantitative Organic Analysis via Functional Group", 3rd Edition, Wiley & Sons, New York, pages 559-561 (1963) using a potentiometric titration.

The strength and elastic properties of the spandex fibers were measured in accordance with the general method of ASTM D 2731-72. Three fibers, a 2-inch (5-cm) gauge length and a 0-300% elongation cycle were used for each of the measurements. The samples were cycled five times at a constant elongation rate of 50 centimeters per minute. Load power (5TP300), the stress on the spandex during the fifth cycle at 300% extension, is reported as gram-force for a given decitex. Unload power (5TM100) is the stress at an extension of 100% for the fifth unload cycle and is also reported in gram-force. Percent elongation at break was measured on a sixth extension cycle.

Percent set was also measured on samples that had been subjected to five 0-300% elongation/relaxation cycles. The percent set, % SET, was then calculated as $$\% \text{ SET} = 100 \times (Lf{-}Lo)/Lo$$

where Lo and Lf are respectively the fiber length when held straight without tension before and after the five elongation/relaxation cycles.

The flatness index of stretch and recovery of the spandex fibers were determined by the ratio of 5TM100/5TP300, which was the ratio of the recovery power or unload power at 100% extension to the stretch power or load power at 300% extension measured in the fifth 0-300% stretch/recovery cycles.

EXAMPLES

The following examples are provided to illustrate the present invention of producing spandex fibers with lower MW glycols, through extended glycol process or under-capping process, to deliver fiber properties similar to those of with higher MW glycols such as PTG L3500 or not achievable with lower MW glycols such as Terathane® 1800. In this way, the spandex manufacturing cost associated with high MW glycols is reduced while still unexpectedly providing soft fiber stretch and recovery performances for improved apparel comfort and fit.

Examples 1-4

Examples 1 through 4 are spandex fibers with polymers made by extended glycol process in accordance with the present invention, starting with a lower MW glycol or glycol mixtures, to achieve the yarn properties such as soft stretch, high elongation and low set which are only achievable with a high MW but higher cost glycol (Comparative Example 5) as presented in FIG. 3.

For Example 1, a mixture of PTG L1400 (210.0 grams) and Terathane® PTMEG 1400 (90.0 grams) was reacted with Isonate® 125MDR (30.03 grams) at 90° C. for 120 minutes to produce an extended glycol, i.e., a linear hydroxy-terminated polyetherurethane macrodiol. This extended glycol had a number average molecular weight of 3446 by determination of hydroxy numbers. The formed extended glycol (300.0 grams) was used to further react with Isonate® 125MDR (40.01 grams) at 90° C. for 120 minutes to form an isocyanate-terminated prepolymer. The prepolymer was mixed with and dissolved into DMAc (587.55 grams), and then reacted with a mixture of EDA/DMAc (138.76 grams with reactive amine concentration at 1.0 milliequivalent per gram in the solution) chain extender solution and DEA/DMAc (10.62 grams with reactive amine concentration at 1.2 milliequivalent per gram in the solution)

chain terminator solution to form a viscous polyurethaneurea solution with 32% polymer solids. This segmented polyurethane had an estimated molecular weight ratio (SSMW/HSMW) of soft segment to hard segment at 14.24 and had the urea hard segment concentration of 6.56% by weight of the polymer.

The polymer solution as made above was mixed with additives in a slurry form, at a level to have approximately 1.35% of LOWINOX® GP45 antioxidant, 0.45% Methacrol® 2462B dye-assist agent, 0.50% silicone-oil based spinning aid and 0.50% ethylene bis(stearamide) (EBS) anti-tack agent based on the total weight of the solids. Such polymer solution including the mixed additives was spun into a 44 dtex 4 filament spandex fiber using a dry-spinning process at a wound-up speed of 869 meters per minute for properties evaluations.

The polymer solution in Example 2 through 4 was made in a similar way as described in Example 1, and was mixed with the same additive slurries and spun into 44 dtex 4 filament fibers using the same spinning conditions.

Comparative Example 5

The polymer in Example 5 was made for comparison using a high MW glycol, PTG L3500, without going through the extended glycol process and with the same additives in yarn and spinning conditions.

Results for Examples 1-4 and Comparative Example 5

Data in FIG. 3 shows that for polymer compositions with HSWT % less than 7.8% and the segment molecular weight ratio (SSMW/HSMW) larger than 12.0, the resulting fibers provided soft stretch/recovery power as indicated by high ratio of 5TM100/5TP300, in addition to low set (<16%) and high elongation (>500%).

Examples 6-10 and 12-15 and Comparative Example 11

Examples 6-10 and 12-15 and Comparative Example 11 are spandex fibers with polymers of the present invention made by under-capping process, starting with a lower MW glycol or glycol mixtures, to achieve the yarn properties such as soft stretch, high elongation and low set which are not achievable with conventional capping processes (See Comparative Example 16).

For Example 6, a mixture of PTG L2200 (180.0 grams) and Terathane® PTMEG 1800 (60.0 grams) was reacted with Isonate® 125MDR (40.51 grams) at 90° C. for 120 minutes to produce a capped glycol, i.e., a linear isocyanate-terminated polyetherurethane prepolymer. The % NCO of this prepolymer was about 1.40. To this capped glycol prepolymer, extra amount (1.00 grams) Isonate® 125MDR was added, followed by the addition of solvent DMAc (551.76 grams) to dissolve the mixture of the capped glycol and added Isonate® 125MDR into a homogeneous solution. The dissolved prepolymer and extra Isonate® 125MDR mixture was then reacted with a mixture of EDA/DMAc (49.30 grams with reactive amine concentration at 2.0 milliequivalent per gram in the solution) chain extender solution and DEA/DMAc (7.11 grams with reactive amine concentration at 1.0 milliequivalent per gram in the solution) chain terminator solution to form a viscous polyurethaneurea solution with 32% polymer solids. This segmented polyurethane had an estimated molecular weight ratio (SSMW/HSMW) of soft segment to hard segment at 17.17 and had the urea hard segment concentration of 5.53% by weight of the polymer.

The polymer solution as made above was mixed with additives in a slurry form, at a level to have approximately 1.33% of LOWINOX® GP45 antioxidant, 0.45% Methacrol® 2462B dye-assist agent and 0.53% silicone-oil based spinning aid based on the total weight of the solids. Such polymer solution including the mixed additives was spun into a 44 dtex 4 filament spandex fiber using a dry-spinning process at a wound-up speed of 869 meters per minute for properties evaluations.

The polymer solution in Examples 7 through 10 and Comparative Example 11 was made in a similar way as described in Example 6 with the use of a mixed glycol of PTG L2200 (180.0 grams) and Terathane® PTMEG 1800 (60.0 grams) reacted with Isonate® 125MDR (40.51 grams) for the capped glycol prepolymer with 1.40% NCO, except that different amount of extra Isonate® 125MDR was mixed in before dissolving into DMAc and chain extending with the mixture of EDA/DEA solutions. The formed polymer solution was mixed with the same additive slurries and spun into 44 dtex 4 filament fibers using the same spinning conditions. The polymer made under Comparative Example 11 was not able to spin into fibers due to frequent breaks in the spinning cell possibly related to the polymer with too high urea concentration (HSWT %) and too low SSMW/HSMW ratio.

The polymer solution in Examples 12 through 15 was made in a similar way as described in Example 6 using Terathane® PTMEG 1800 alone reacted with Isonate® 125MDR for making the capped glycol prepolymer, followed by addition of extra amount of Isonate® 125MDR at different levels, dissolution with DMAc and chain extension with EDA/DEA solutions to make the polymer solutions.

Comparative Example 16

Comparative Example 16 was made as a comparative example with a higher urea hard segment content (HSWT %) and lower SSMW/HSMW ratio, using a conventional capping process without added extra diisocyanate.

Results for Examples 6-15 and Comparative Example 16

The Table of FIG. 4 illustrates the yarn properties of Examples 6-10, 12-15 and Comparative Examples 11 and 16. Yarns of Examples 6 through 10 and 12 through 15, prepared in accordance with the present invention from polymer compositions prepared by under-capping process wherein the HSWT % was less than 7.8% and the segment molecular weight ratio (SSMW/HSMW) was greater than 12.0, exhibited flat stretch/recovery power as indicated by high ratio (>0.09 in general) of 5TM100/5TP300, in addition to low set (<16%) and high elongation (>500%).

Comparative Example 11, also prepared via the under-capping process, showed that there is a limit for high urea hard segment content and low SSMW/HSMW ratio, beyond which causes spinning difficulties.

Comparative Example 16, which used a conventional capping process with high urea hard segment content (HSWT %) and low SSMW/HSMW ratio in the polymer, confirmed the yarn properties with high set and steep stretch/recovery power as indicated by the low ratio of 5TM100/5TP300.

Examples 18-25 and 28-30

Examples 18-25 and 28-30 are additional examples of polymers prepared by the under-capping process of the present invention using Terathane® PTMEG 1800 alone reacted with Isonate® 125MDR for making the capped glycol prepolymer, followed by addition of extra amount of Isonate® 125MDR at different levels, dissolution with DMAc and chain extension with EDA/DEA solutions to make the polymer solutions. These examples were made to further define the segmented polyurethaneureas with engineered soft segment and hard segment molecular weights and their impact to the fiber properties. These polymers were prepared in a similar way as those of Examples 12 through 15, and were spun into 44 dtex fibers for properties comparisons.

Comparative Examples 26 and 27

Comparative Example 26 was made by the under-capping process but is outside the scope of the present invention, and Example 27 was made by a conventional capping process with no additional MDI added to the capped glycol prepolymer.

Results for Examples 18-25 and 28-30 and Comparative Examples 26 and 27

As shown in the Table in FIG. 5, for Examples 18-25 and 28-30 prepared with the under-capping process of the present invention, all polymers spun well and gave superior yarn properties in terms of set, elongation and flatness in stretch and recovery. In contrast, Comparative Example 26 could not be spun and Comparative Example 27 did not exhibit these superior yarn properties due to high urea concentration (HSWT %) and low SSMW/HSMW ratio.

Example 33 Through 37

Examples 33 through 37 of segmented polyurethaneureas were also made by the under-capping process in a similar way as those Example 12 through 15, except an even lower molecular weight glycol, Terathane® PTMEG 1400, was used in reaction with Isonate® 125MDR for making the capped glycol prepolymer, followed by addition of extra amount of Isonate® 125MDR at different levels, dissolution with DMAc and chain extension with EDA/DEA solutions to make the polymer solutions. The polymer compositions including the engineered soft segment and hard segment molecular weights as well the 44 dtex fiber properties are listed in the table of FIG. 6.

Comparative Examples 31 and 32

Comparative Example 31 was made via a conventional capping process and demonstrates a composition and properties outside the scope of this invention. Comparative Example 32 shown in FIG. 6 was made via the under-capping process but outside the composition range of this invention and was unable to be spun into a fiber.

Results for Examples 33-37 and Comparative Examples 31 and 32

Examples 33-37 further confirm the benefits of segmented polyurethaneureas with engineered soft segment and hard segment molecular weights at a ratio higher than 12.0 and a HSWT % lower than 7.8 prepared in accordance with the present invention, in terms of polymer quality for spinning and the yarn properties.

What is claimed is:

1. A process for producing an isocyanate-terminated prepolymer by glycol extension for use in forming a segmented polyurethane or polyurethaneurea polymer with engineered soft segment and hard segment molecular weights with an HSWT % of from 3.62% to 7.79% and a segment molecular weight ratio (SSMW/HSMW) larger than 12.0, said method comprising: (a) reacting an excess amount of a lower molecular weight glycol with a diisocyanate to form an extended glycol derived from a glycol having a molecular weight of 1400 to 2500; and (b) reacting the formed extended glycol with an excess amount of a diisocyanate to produce an isocyanate-terminated prepolymer or capped glycol,
   wherein the isocyanate-terminated prepolymer or capped glycol exhibits a SET % of from 1.8% to 18%.

2. The process of claim 1 wherein the diisocyanate used in step (a) to make the extended glycol can be same or different from the diisocyanate used in step (b) to make the capped glycol prepolymer.

3. The process of claim 1 further comprising dissolving the capped glycol prepolymer in a solvent and chain extending with a diol or diamine to form a segmented polyurethane or polyurethaneurea polymer with engineered soft segment and hard segment molecular weights.

4. A process for under-capping glycols for production of a polymer with engineered hard and soft segment molecular weights, said method comprising:
   (a) adding a diisocyanate to a glycol at a low capping ratio to produce an under-capped capped glycol, wherein the glycol has a molecular weight of 1400 to 2500;
   (b) adding additional diisocyanate to the capped glycol; and
   (c) adding a chain extender to produce the polymer with engineered hard and soft segment molecular weights,
   wherein the polymer has an HSWT % of from 3.62% to 7.79%, and
   wherein the polymer exhibits a SET % of from 10.8% to 18%.

5. The process of claim 4 wherein molecular weight of the soft segment is increased without reducing molecular weight of the hard segment.

6. The process of claim 4 wherein the glycols are selected from 3-methyl THF copolyether glycol or PTMEG.

7. The process of claim 4 wherein the diisocyanate used in step (a) is methylene diphenyl diisocyanate.

8. The process of claim 4 wherein the chain extender is ethylene diamine.

9. The process of claim 1 where steps (a) and (b) are performed with heat.

10. A polymer with engineered hard and soft segment molecular weights produced in accordance with the process of claim 1.

11. A fiber made from the polymer in claim 10.

12. An article of manufacture at least a portion of which comprises the fiber of claim 11.

* * * * *